(12) United States Patent
Fumagalli et al.

(10) Patent No.: US 10,948,191 B2
(45) Date of Patent: Mar. 16, 2021

(54) MAGNET-THERMOCOUPLE SYSTEM FOR FAIL-SAFE SUPPLY OF GAS TO BURNERS OR THE LIKE

(71) Applicant: CastFutura S.p.A., Terno d'Isola (IT)

(72) Inventors: Ivan Fumagalli, Terno d'Isola (IT); Augusto Marco Culatti, Terno d'Isola (IT); Marco Corbella, Terno d'Isola (IT); Marcello Toscani, Terno d'Isola (IT)

( * ) Notice: Subject to any disclaimer, the term of this patent is extended or adjusted under 35 U.S.C. 154(b) by 77 days.

(21) Appl. No.: 16/196,963

(22) Filed: Nov. 20, 2018

(65) Prior Publication Data
US 2019/0195507 A1 Jun. 27, 2019

(30) Foreign Application Priority Data
Nov. 30, 2017 (IT) .......................... 102017000137767

(51) Int. Cl.
*F16K 31/02* (2006.01)
*F24C 3/12* (2006.01)
(Continued)

(52) U.S. Cl.
CPC ............ *F24C 3/124* (2013.01); *F16K 31/025* (2013.01); *F23N 5/102* (2013.01); *F23N 5/105* (2013.01);
(Continued)

(58) Field of Classification Search
CPC ............................... F24C 3/124; F16K 31/025
(Continued)

(56) References Cited

U.S. PATENT DOCUMENTS

| | | | |
|---|---|---|---|
| 2008/0030351 A1* | 2/2008 | Horne | F24C 3/14 340/578 |
| 2011/0207065 A1* | 8/2011 | Shaffer | F24C 3/103 431/73 |
| 2014/0165927 A1* | 6/2014 | Zelepouga | F23N 5/265 122/14.22 |

FOREIGN PATENT DOCUMENTS

| | | |
|---|---|---|
| DE | 102007015822 | 10/2008 |
| EP | 1070919 | 1/2001 |
| GB | 2249382 | 5/1992 |

OTHER PUBLICATIONS

Italian Ministry of Trade Development, Search Report, dated Jul. 17, 2018 (Search performed by the European Patent Office).

* cited by examiner

*Primary Examiner* — Avinash A Savani
(74) *Attorney, Agent, or Firm* — Themis Law

(57) ABSTRACT

Magnet-thermocouple for the fail-safe safety supply of gas to burners or the like, in particular of fail-safe safety control for domestic cooking devices, comprises: at least one gas burner, which gas burner is connected to a gas supply source by flame-regulating means and by means of a safety valve driven by a flame presence sensor consisting of a thermocouple, said safety valve having an open condition, wherein said supply source supplied said burner, and a closed condition, wherein the gas passage is interrupted and wherein the thermocouple, in the presence of a flame, generates an electrical signal constituting the drive signal for the passage of said safety valve from an open condition to a closed condition, and vice-versa, of said safety valve, whereas a further drive signal generator and power supply of said safety valve is provided, for the temporary and alternative supply of the safety valve during the flame ignition step heating the thermocouple, to the temperature generating the drive signal. According to the invention, the signal generator (Continued)

and power supply comprise power limiters to limit the signal generated and an automatic deactivating unit whenever the power supply is overloaded for a predefined amount of time, the power necessary for the drive signal of the safety valve being greater than the one determined by the limiters.

15 Claims, 7 Drawing Sheets

(51) Int. Cl.
    *G01K 7/02*     (2021.01)
    *H01F 7/06*     (2006.01)
    *F23N 5/24*     (2006.01)
    *F23N 5/10*     (2006.01)
    *F23N 5/20*     (2006.01)
    *F24C 3/10*     (2006.01)

(52) U.S. Cl.
    CPC ............... *F23N 5/20* (2013.01); *F23N 5/242* (2013.01); *F23N 5/245* (2013.01); *F24C 3/103* (2013.01); *F24C 3/126* (2013.01); *G01K 7/02* (2013.01); *H01F 7/064* (2013.01); *F23N 2223/42* (2020.01); *F23N 2231/04* (2020.01); *F23N 2231/06* (2020.01); *F23N 2231/10* (2020.01); *F23N 2235/14* (2020.01); *F23N 2241/08* (2020.01)

(58) Field of Classification Search
    USPC .......................................................... 431/86
    See application file for complete search history.

MAGNET-THERMOCOUPLE SYSTEM FOR FAIL-SAFE SUPPLY OF GAS TO BURNERS OR THE LIKE

FIELD OF THE INVENTION

Object of the present invention is a magnet-thermocouple system for the fail-safe supply of gas to burners or the like, in particular for a positive safety control for domestic cooking devices, such system comprising:

at least one gas burner, which is connected to a gas supply source by flame-regulating means and with a safety valve driven by a flame presence sensor consisting of a thermocouple, said safety valve having an open condition, wherein said supply source supplies said burner, and a closed condition, wherein the passage of gas is interrupted, wherein the thermocouple, in the presence of a flame, generates an electrical signal constituting the drive signal for the switching of said safety valve from the open condition to the closed condition, and vice-versa, whereas a further drive signal generator and power supply of said safety valve is provided, for the temporary and alternative supply of the safety valve during the flame ignition step heating the thermocouple, to the temperature generating the drive signal.

SUMMARY OF THE INVENTION

In a domestic gas cooking system according to the current state of the art, both the cookers of the stove and the oven use a positive safety system obtained by a gas-intercepting magnet introduced in the tap and by a thermocouple keeping it hooked.

As is known by the technicians of the sector, the thermocouple is not able to generate enough energy to directly activate the magnet from the resting, gas closed, position. The magnet must be activated in a voluntary way by means of a mechanical approach obtained by pressing on the gas drive knob. The pressure, and therefore the keeper, must then be pressed for a certain period of time, usually 0.5-2 seconds after igniting the flame and until the thermocouple produces enough energy to keep the magnet engaged even without mechanical pressure.

A system of this type is shown in FIG. 1. As clearly shown, the safety valve 1 is directly supplied by the signal of the thermocouple 2.

A tap for regulating the gas supply of a burner, and which is provided with a safety valve, is described in the patent application nr. GE14A000074 of the same owner. This document describes a flame-igniting control device comprising flame-regulating means connected to a gas supply source through at least one valve and which comprise a drive member constituted by a drive shaft mounted rotatably around its longitudinal axis and translatably in direction of its longitudinal axis, so that to switch between two extreme positions, respectively from a condition of maximum extraction to a condition of maximum insertion. A control unit comprises two conductive elements connected to an electrical power supply and a switch, which switch has a closed condition, wherein the two conductive elements are connected to one another, and an open condition, wherein the two conductive elements are not connected to one another, said switch passing from the closed condition to the open condition through the movement of a switching member to switch the condition of the switch, the switching member being moved by the translation of said drive shaft, so that to ensure that the closed condition of said switch corresponds to the condition of maximum insertion of said drive shift. The switching member is provided coaxially to said drive shaft and, in addition to driving the activation of the ignition electrode of the flame, it supplies or directly and mechanically leads the safety valve to the open condition, as long as the flame has not ignited and the thermocouple has started to provide a flame presence signal useful in keeping the safety valve in an open condition.

Although the system according to the state of the art guarantees a positive safety control of the flame, it does have an important, not negligible and annoying secondary effect, i.e. the necessity to keep on pressing on the knob of the gas tap for the time necessary for the thermocouple to generate a sufficient signal to the hook of the magnet. Moreover, to date, this system does not allow the easy regulation and/or control of the gas flame. In fact, with regard to the controlled gas stove offers, the market tends to eliminate the magnet/thermocouple system, preferring the much more expensive electrovalve system.

According to a first object, the present invention aims to achieve a system that, by using the combination of thermocouple with a safety valve driven by magnet like a safety system, and the thermocouple like a flame-detection system, such as in the patent application GE2011A000135 of the same owner for example, adds the possibility to intervene on the control magnet of the safety valve by means of a unit outside of the thermocouple-magnet ring in order to allow the magnet to be driven in alternative to the thermocouple and by simply pressing on the drive tap for the time needed to guarantee the activation of the signal of the thermocouple, usually named zero time function.

According to a further aspect, the invention aims to implement a system that allows turning off the magnet, therefore possible functions to cut off the flame in due time, safely or according to other related variables.

According to a further aspect, the invention aims to implement a system that allows carrying out the automatic ignition of a gas burner, wherever allowed by law, at a certain time, and to regulate the temperature in cycles and/or with other related functions.

A first embodiment of the invention provides a system according to the preamble of claim 1 and wherein the system is characterized by the presence of a power supply able to supply and/or stop the magnet.

An embodiment also provides a manual approach for supplying the magnet, i.e. driving it manually or automatically as better described below.

The system according to the present invention is therefore characterized in that the power supply increased in two distinct steps can only exist for a brief period of time, after which the power supply cedes power as a sort of self-protection, therefore preventing the magnet from being supplied.

According to an embodiment of the invention, a system according to the preamble of claim 1 further provides that the signal generator and power supply comprise power limiters to limit the signal generated and an automatic deactivating unit whenever the power supply is overloaded for a predefined amount of time, the power necessary for the drive signal of the safety valve being greater than the one determined by the limiters.

In one embodiment, the system according to the present invention can be schematized by dividing it into two parts at the design level: the generation and power supply circuit and the load drive circuit, wherein the load is constituted by the drive magnet of the safety valve.

In this embodiment, the load drive circuit works with a preselected quantity of energy, the quantity of energy provided to the load is greater than the one provided to the power supply assembly arranged upstream of the drive circuit.

The signal drive generator and power supply circuit of the safety valve, that was designed to guarantee the nominal performances in the worst operating conditions (maximum load and temperature), is subjected to an overload condition during the load driving step for the turning off or on of the system, since that the energy required exceeds the normal operating value guaranteed. This overload can be supported by a predetermined maximum amount of time. In this maximum amount of time, the energy required to supply the servocontrol magnet of the safety valve, so that to keep the safety valve in an open condition for the passage of the gas to the burner, is available and the duration of said maximum time is linked to the operating temperature of the device, which is influenced by the dissipative areas and the size of the inductive part.

As will become clearer in the following description, an embodiment of the system provides that the drive signal generator and power supply of the safety valve is of the switching type or the like.

With reference to the example relative to the state of the art, an embodiment of the present invention can provide a manual driven member controlling the power supply for generating and supplying a drive signal of the safety valve, the drive activating said power supply as the drive signal of the safety valve is generated and supplied in the condition wherein the gas is supplied to the burner.

An embodiment variation can be provided in alternative or in combination with the preceding one, providing an automatic drive member of the power supply for generating and supplying a drive signal of the safety valve, which automatic drive member activates and deactivates the power supply as the drive signal of the safety valve is generated and supplied depending on a request signal generated on the basis of a drive software.

In combination with the safety control valve and/or flame detecting thermocouple or an alternative flame detecting device, an embodiment variation of the present invention provides, in combination with one or more of the preceding claims, an ignition device constituted by an ignition electrode and electrical power supply means thereof that send current pulses to said ignition electrode in order to generate a spark at the nozzles of said burner and wherein said manual drive means simultaneously also activate the supply of the signal to said ignition electrode.

According to another embodiment that can be provided in combination with any embodiments and embodiment variations described above, the power supply is configured to generate drive signals of the safety valve with different polarizations in order to temporarily drive said valve to an open gas passage condition for the activation period of the thermocouple, at the transmission of the flame presence signal and to drive, with a reversed polarity drive signal, the closing of the safety valve in a flame presence condition, compensating the drive signal of the safety valve generated by said thermocouple.

In an embodiment provided in combination with the preceding one, the system provides one or more timers that can be of the electromechanical and/or electronic, analog and/or digital type and which can be set for programming the turning off and/or on of the flame beyond a certain amount of time programmed by the user and/or after a certain predefined amount of ignition time with a safety function, i.e. to activate or deactivate the generation and supply of the safety valve and/or of the ignition electrode, respectively of the closing or opening drive signal of the safety valve and of the supply signal of the ignition electrode.

According to another embodiment, which can be provided in combination with one or more of any of the preceding embodiments and embodiment variations, the generator and power supply and/or automatic drive unit are provided in combination with luminous and/or acoustic signaling means of the operating condition of the safety valve and/or of the burner.

In this case an embodiment variation of the system provides, in alternative or in combination with the visual and/or acoustic signaling means, local message transmission means of the operating condition for transmitting to a remote reception unit, such as a smartphone or remote computer or other portable communication units, said portable unit being possibly provided with remote signal generation and transmission means of drive signals of the generator and power supply of the drive signals of the safety valve and/or the ignition electrode.

In alternative or in combination, the system can also be provided with a visual and/or acoustic signaling unit and/or with means to transmit operational information messages to remote devices, in particular portable, for the indication of the flame presence condition.

With regard to the flame detecting means, it is also possible to provide ionization sensors or to combine a magnetic detection unit of the current of the thermocouple to the thermocouple.

Embodiment variations also provide the presence of flame detecting means constituted by optical, thermal and magnetic sensors in combination with the thermocouple or with the ionization sensors.

According to an embodiment, the invention provides a cooking device with one or more burners, wherein only one or at least one of the burners is combined with a system according to the present invention and to one or more of the embodiments described above.

Given that the cooking devices are generally provided with two or more burners, an embodiment variation of the present invention provides a system equipped with a centralized generator/power supply for a drive signal shared by a plurality of control valves, each of which is combined with one of a plurality of gas feed taps, with a different related burner and with a control unit of the power supply of the drive signal of the respective safety valve for each different tap of said plurality of taps.

An embodiment variation of the preceding one described and wherein the system comprises a plurality of taps, each with one of its own safety valves and each tap combined with a different burner of a plurality of burners, provides a modular construction in an executive example, said modular construction of the system comprising three modules, of which a first module is constituted by the power supply generator of the drive signal of the safety valves, which is shared by all of the safety valves, a basic drive module for driving the power supply condition of the drive signal of the safety valve and/or ignition electrode and a separate module for each tap, comprising the activation/deactivation timers of a corresponding burner.

The system according to the present invention has further characteristics that are described hereinafter.

BRIEF DESCRIPTION OF THE DRAWINGS

These and further characteristics and advantages of the present invention will become clearer in the following description of some exemplary embodiments depicted in the accompanying drawings, in which.

DETAILED DESCRIPTION OF EMBODIMENTS OF THE INVENTION

Figure 1:
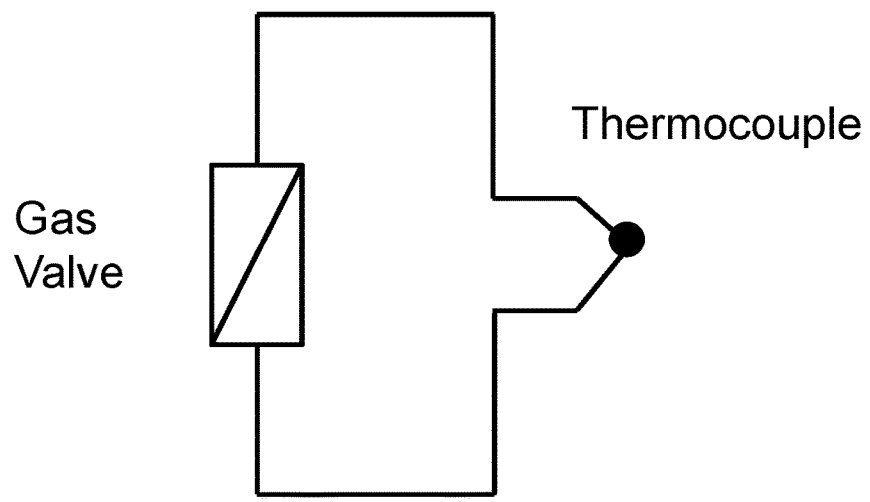
FIG. 1 shows a block diagram of an example of a system according to the state of the art.
Figure 2:
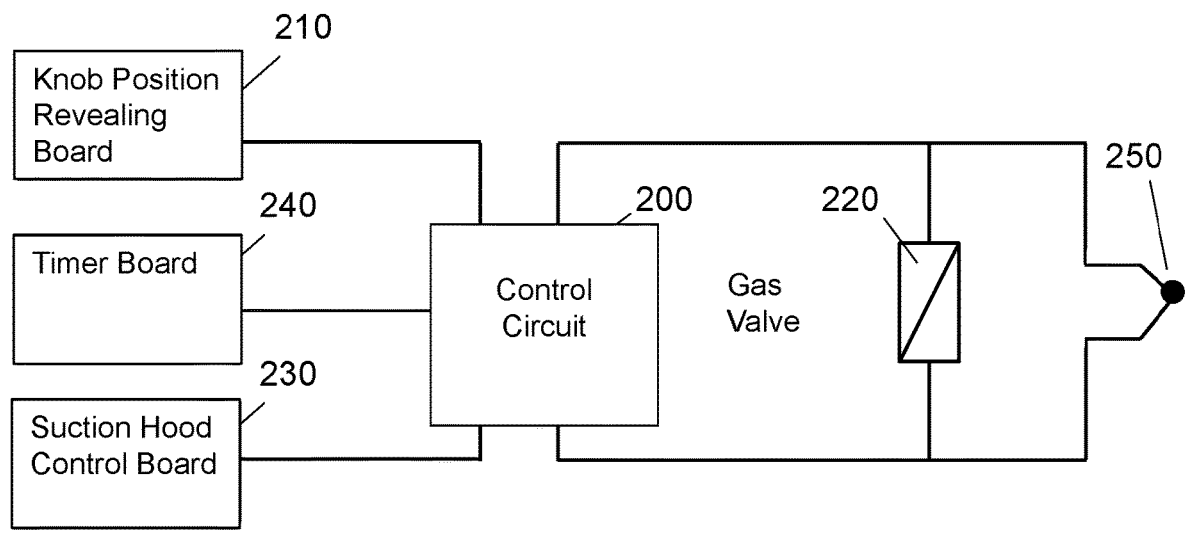
FIG. 2 shows a block diagram of a first embodiment according to the present invention.

With reference to FIG. 2, in an embodiment of the present invention, at the design level, the circuit is subdivided into two parts, of which a first one is constituted by the power supply circuit and a second one is constituted by the load drive circuit. Those two parts are shown integrated in a single box 200 denoted as drive circuitry. The load 220 is constituted by the servocontrol magnet coil of the safety valve, which assumes a stable closed condition preventing the passage of gas to the burner is prevented, and which is mechanically and automatically urged in the absence of an electrical excitation signal of the magnet. Whenever this signal is present, the magnet determines the displacement of the shutter of the safety valve in an open gas passage condition, against the action of the mechanical means that urge said shutter in a stable way in the closed condition, that is, against the seat of the valve. The load drive circuit 220 works with a preselected quantity of energy. This preselected quantity, which is supplied to the load in order to determine the switching of the safety valve to the open condition, is greater than the quantity that can be supplied from the power supply assembly arranged upstream of the drive circuit.

As depicted in FIG. 2, the drive circuitry 200 can be combined with a manually activated control of the activation of the generation and power supply of the drive signal to the safety valve. This manually activated control can be a switch, a button, a knob to activate the regulation tap of the gas flow to the burner and is provided with a drive movement, and the drive generated by the manually activated member is transformed into an electric signal provided to the drive circuitry 200 by a suitable detection board detecting the activation of the manual control denoted by 210.

In alternative or in combination with the manually activated control with the relative detection board 210, an automatic drive unit may be provided operating, for example, by means of one or more programmable timers 240. These timers allow setting the turn on and turn off times of the burner combined with the corresponding safety valve, due to the activation of the power supply generator of the drive signal and of the drive unit, which are depicted as integrated in the drive circuitry 200.

Other operative units may be linked to control the drive circuitry 200 in order to drive the safety valve to the open gas passage condition or the closed condition of said passage.

In the illustrated embodiment, the control board of a suction hood 230 is depicted as an example. This example must not be considered limiting with regard to further possible examples that can be provided in alternative or in combination with the same.

As mentioned, an additional activation board (not shown) of a flame ignition electrode may be provided at the burner.

The power supply circuit was designed to guarantee the nominal performances under the worst operating conditions (maximum load and temperature). The energy required is beyond the normal operating value guaranteed during the load driving step for the turning off or on. The maximum time period during which this energy is available is linked to the operating temperature of the device, to the dissipative areas and the size of the inductive part.

250 denotes a thermocouple or other flame detecting system generating or driving the generation of a drive signal to open the safety valve 220 in the presence of a flame.

Figure 3:
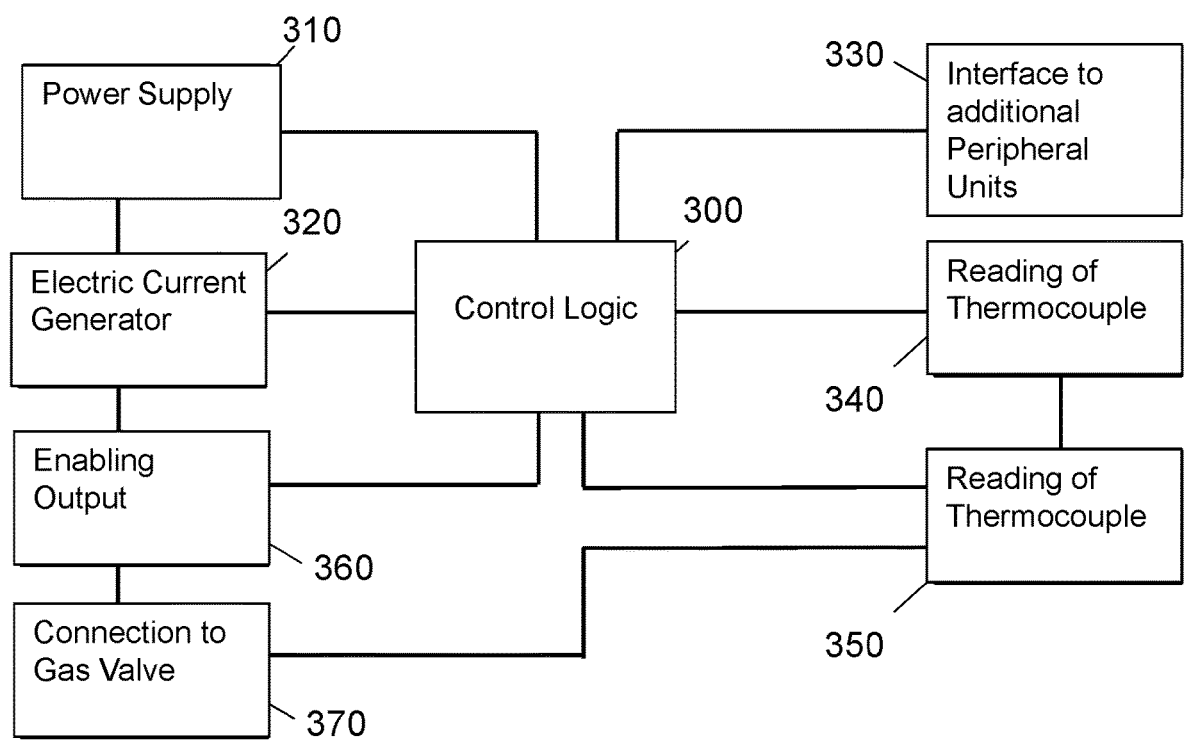
FIG. 3 shows an operational block diagram of an embodiment according to the present invention.

FIG. 3 shows an operational block diagram of an exemplary embodiment according to the present invention and which makes the conceptual subdivision of the drive circuitry of the preceding example into two parts even clearer.

The drive unit is essentially constituted by an electronic control 300 that performs a control logic. The control logic can be constituted by software in which the instructions for a processing unit are encoded and which instructions configure said processing unit to carry out the operational steps of the system.

The control logic can be in the form of an executable software or firmware, or can essentially be implemented, in a fixed way, in a hardware specifically constructed and configured to execute the operations defined by the control logic itself.

The power supply 310 provides energy to a current generator 320, which generates the drive signal of the safety valve, and the control logic manages the methods through which the signal is transmitted 370 to the safety valve in order to control it during the opening and closing, in particular in the start-up step of the thermocouple at the time of a flame ignition or in the controlling step of the automatic and programmed turn-off function of the burner on the basis of the settings performed in the various timers.

A section 360 activates the generator output under the control of the control logic 300 and provides the drive signal to the safety valve, denoted by 220 in FIG. 2 and herein represented by the connection 370.

The control logic 300 manages the interfaces with the other units, such as one or more timers, the thermocouple, the flame igniting electrode, the sensor activating the suction hood and the like.

The interface 330 is facing the connection of the control logic 300 to the various peripheral units, such as the timers, the ignition electrode, the suction hood and others, whereas the blocks 340 and 350 separately denote the operational connection to the thermocouple. In this case, the block 350 for reading the signal of the thermocouple acts both directly on the safety valve 220 and indirectly through the control logic 300.

FIGS. 4A and 4B, and 5A and 5B, show a more detailed exemplary embodiment of the power supply generator according to the invention.

Figure 4A:
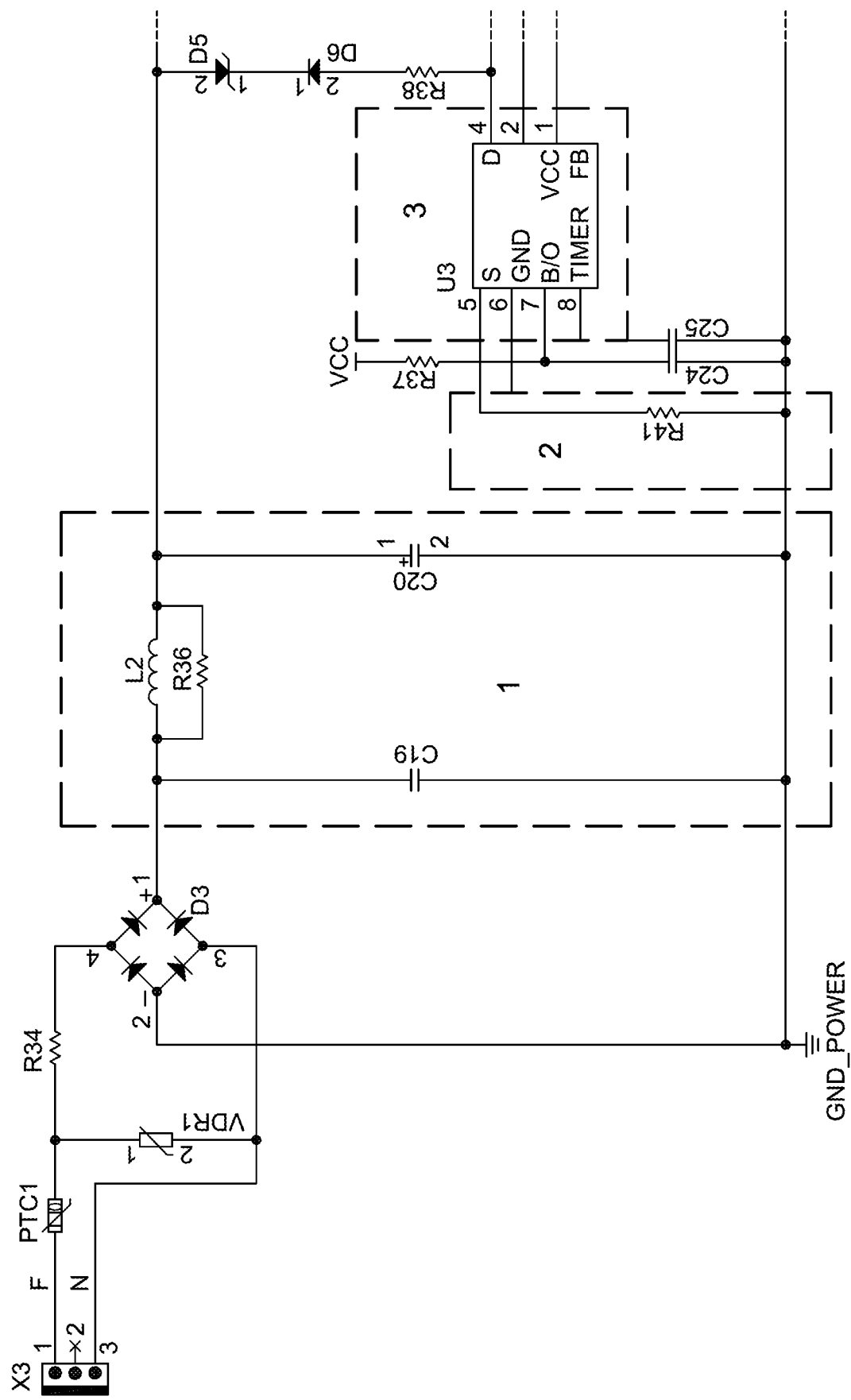
FIGS. 4A and 4B, and 5A and 5B, show the detailed circuit diagram of an embodiment according to the present invention, wherein FIG. 4A and respectively 5A is the left part of the circuit and FIG. 4B and respectively 5B is the right part.
Figure 4B:
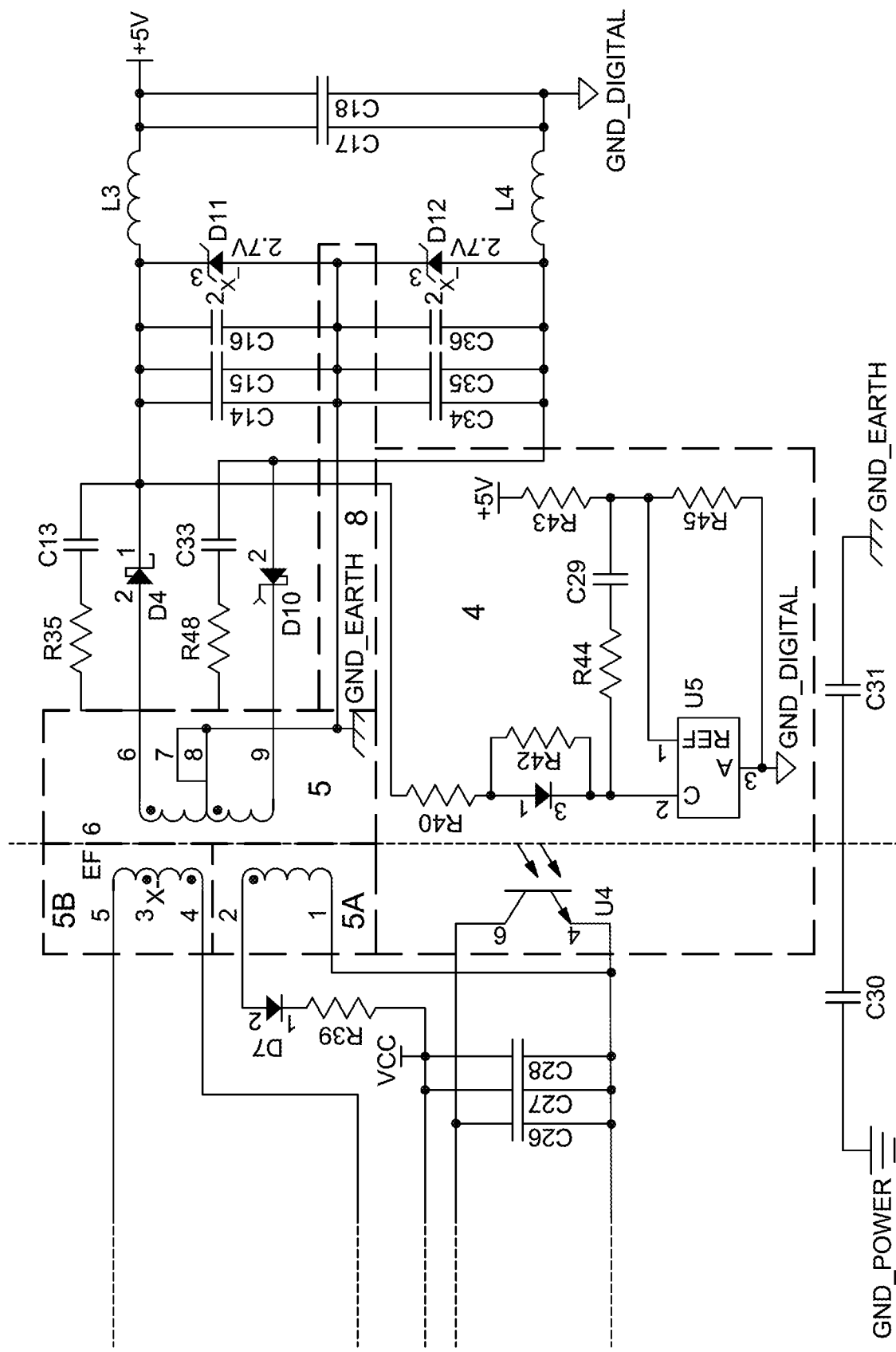

The power supply circuit is made galvanically isolated and is constituted by a switching power supply for high temperatures (FIGS. 4A and 4B). This type of power supply is composed of a control logic, a bulk capacitor denoted by 1, and a transformer denoted by 5, 5A, 5B in FIGS. 4A and 4B. The transformer guarantees the galvanic isolation between the drive stage and stage connected to the load. The value of the primary inductance of the transformer, denoted by 5B, determines the maximum current circulating in the transformer and, consequently, the maximum power that the power supply circuit can deliver. The control logic manages a limiting resistor for a further reduction of the current circulating in the primary, named R41 and denoted by 2 in the scheme of FIGS. 4A and 4B. This allows monitoring and limiting the maximum current of the transformer primary.

The correct sizing of the transformer primary, denoted by 5B, allows greater efficiency of the entire power supply, holding down the temperatures as well as limiting the maximum current available to the load.

The power supply circuit controls and regulates the output voltage, for the operations of the system, the power supply generates two output voltages connected to one another and to the connection point of these outputs for the ground reference connection denoted by 8.

In order to improve the power supply to the safety valve of the gas, the output circuit, which is connected to the power supply, limits the maximum power by different methods:

through limitation hardware through software for limiting the power available.

With these operating methods, it is possible to guarantee a minimum quantity of drive energy without causing the intervention of the protections. In case of abnormal operations, with the system supplying the load in an incorrect way, the protections are automatically activated and the entire system is turned off.

Two types of operations are described in detail here below.

Figure 5A:
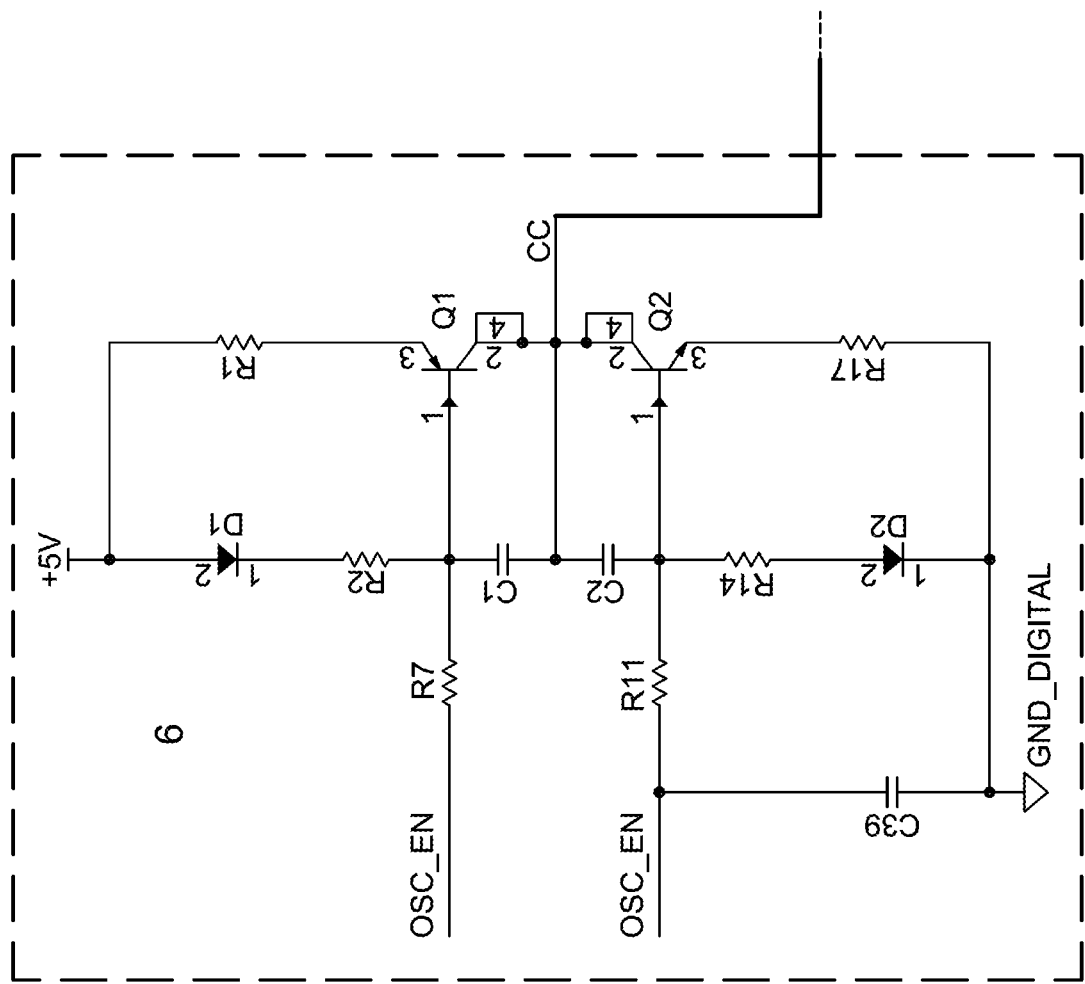
Figure 5B:
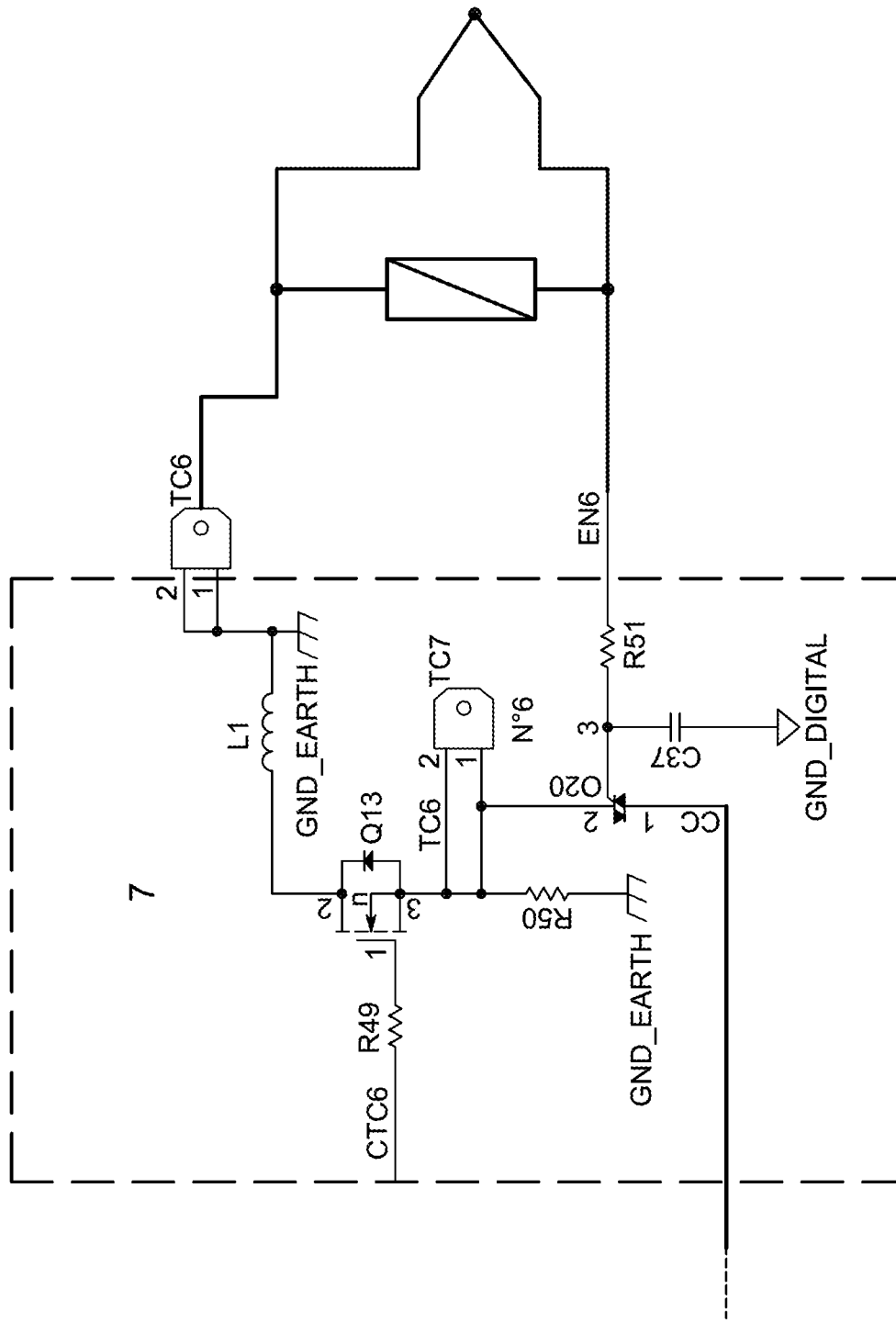

Limitation Operation with the Hardware Method:

An output current, both positive and negative with respect to the constant ground, is generated by means of a circuit, as denoted by 6 in FIGS. 5A and 5B. This output current, together with the constant supply voltage, and which is regulated by the power supply denoted by 4 in FIGS. 4A and 4B, causes a constant-power supply of the coil of the safety valve. The limitations of power provided by the power supply circuit and that are derived from the limited voltage of the primary and the voltage of the secondary stabilized by the square wave generator 6 (in FIGS. 5A and 5B) with constant current, define the operating limitations of the circuit in terms of hardware.

Whenever the system is provided for a unit with more burners, or in the presence of a device with a plurality of burners of which at least one for each burner, by means of a further assembly of components, the components of this assembly are replicated for each burner, as denoted by 7 in FIGS. 5A and 5B. In this case, it is possible to select one or more burners to which the drive signal can be applied or to read the current of the thermocouple according to one or more known methods of the state of the art.

Limitation Operation with the Software Method:

By controlling the signals of the generator, activated and deactivated at constant and controlled time intervals, a quantity of energy is transferred to the load to allow it to be driven without overloading the power supply and without turning it off. This drive system is possible due to the operations of the safety valves, which remain open by means of a magnetic hook, which, by nature, has a magnetic hysteresis, therefore the magnetic field maintaining the valve open is equal to the average value of the current in the moment the circuit is supplying and the value weighed, whenever not supplied, as a function of the time and percentages of the two situations.

In an embodiment, the weighing is carried out according to the following function:

(Energy on)*% (time on))+(Energy off)*% (time off)).

To summarize the above disclosure, by means of the hardware part of the board, a supply may be generated with defined power of the safety valve and thermocouple assembly, and by means of a timed management, via software, it is possible to select the value of the energy to be transferred to the safety valve so that to be able to regulate the average value thereof.

In addition to the preceding disclosure, the system is adapted to generate, with the same concept, both positive and negative signals with respect to the 0 plane of the gas valve, thus providing, depending on the polarity generated, for keeping the safety valve open or forcing it to close.

Figure 6:
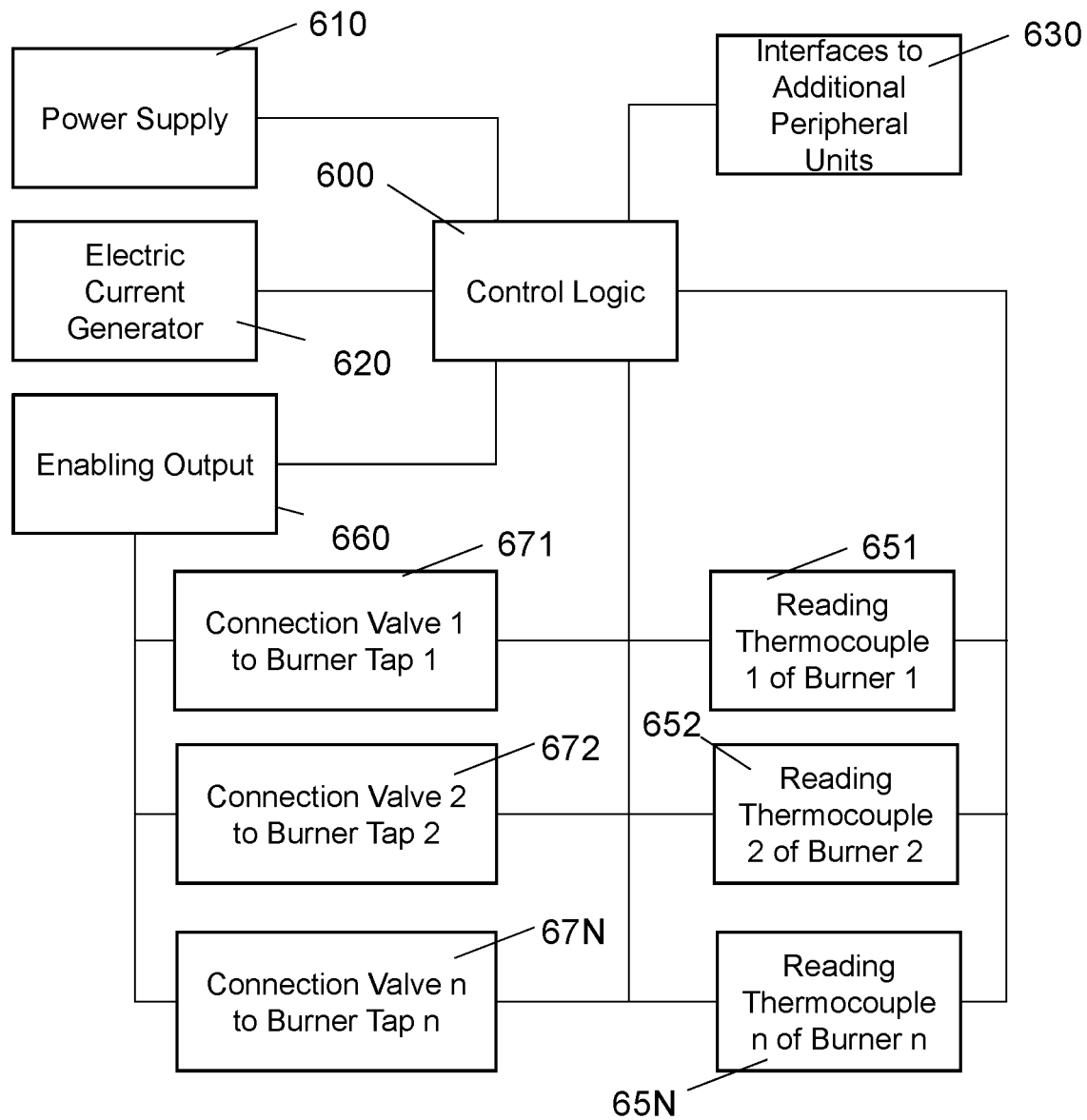
FIG. 6 shows an embodiment variation of the embodiment in FIG. 3, wherein the system operates in combination with a plurality of burners, 1, 2, . . . , n, each with a thermocouple and gas flow regulation tap provided with a safety valve.

FIG. 6 shows an embodiment, in which the system is provided in combination with a plurality of burners, each of which is supplied by a tap for regulating the gas flow and which comprises a safety valve, each of the burners being provided with at least one flame presence device, in particular with a thermocouple.

In the scheme of FIG. 6, the individual valves combined with the burners 1, 2, . . . , n are denoted by 671, 672, 67n. Similarly, the thermocouples combined with each burner 1, 2, . . . , n are denoted by 651, 652, 65n.

The power supply 610, the generator 620 and an activator of the outlet of the generator 660 are controlled, like in the example of FIG. 3, by the control logic 600.

Similarly to the example in FIG. 3, there are connecting interfaces 630 to connect to one or more further units, such as a flame igniting spark plug, an operating sensor or an activation actuator of a suction hood and other peripheral units for example.

According to a further characteristic, each of the embodiments illustrated can provide means for generating the indication signals relative to the operating conditions of the system. Whenever more burners are provided, it is possible to have dedicated and separate signaling devices for each burner. The signaling devices can be luminous or visual and/or acoustic.

By providing a peripheral device constituted by a transmitting/receiving unit, for example by means of wireless or telephonic or other types of protocols, it is also possible to send the signals to remote units, such as remote control boards or portable devices for example, such as smartphones or similar.

According to another embodiment, the remote devices according to one or more of the variants described can also be configured to operate like user interfaces for the inputting of activation commands and/or program data for turning actions on and/or off with respect to one or more burners in combination with the embodiment variation of the system allowing these operations and which is described above.

According to another embodiment, flame detecting means may be provided that are different from simple thermocouples. These means can be provided in place of the thermocouples or in addition to them and they can be, for example, visual detecting means, and/or ionization means or means using other physical effects of a flame presence condition.

The invention claimed is:

1. A magnet-thermocouple system for a positive safety supply of gas to burners for a positive safety control of domestic cooking devices, comprising:

a gas burner connected to a gas supply source with a flame-regulating system and with a safety valve driven by a flame presence sensor comprising a thermocouple, wherein said safety valve has an open condition, wherein said supply source supplies said burner, and a closed condition, wherein passage of gas is interrupted, wherein the thermocouple, when a flame is present, generates an electrical signal constituting a drive signal that switches said safety valve from the open condition to the closed condition, and vice versa, further comprising an additional power supply of a drive signal of said safety valve, for a temporary and alternative supply of the safety valve during flame ignition that heats the thermocouple, to a temperature generating the drive signal, wherein the additional power supply of the drive signal comprises power limiters to limit the generated signal and an automatic deactivating unit when the power supply is overloaded for a predefined amount of time, the power necessary for the drive signal of the safety valve being greater than the one determined by the limiters, and wherein the power supply of the drive signal is provided with thermal safety elements against overheating in an overload condition, when more energy is requested than a predefined level of deliverable energy.

2. The system according to claim 1, wherein the power supply of the drive signal is of a switching type.

3. The system according to claim 1, further comprising a manual drive member controlling the power supply of the drive signal of the safety valve, the manual drive member activating said power supply to generate and supply the drive signal of the safety valve when the gas is supplied to the burner.

4. The system according to claim 1, further comprising an automatic drive member of the power supply of the drive signal of the safety valve, the automatic drive member activating and deactivating the power supply of the drive signal of the safety valve depending on a request signal generated based on a drive software.

5. The system according to claim 3, further comprising an ignition device comprising an ignition electrode and an electrical power supply thereof, which send current pulses to said ignition electrode to generate a spark at nozzles of said burner, said manual drive member also simultaneously activating the power supply of the drive signal to said ignition electrode.

6. The system according to claim 1, wherein the power supply is configured to generate drive signals of the safety valve with different polarizations so as to temporarily drive said safety valve to an open gas passage condition for an activation period of the thermocouple to transmit a flame presence signal and to drive, with a reversed polarity drive signal, a closing of the safety valve in a flame presence condition, compensating the drive signal of the safety valve generated by said thermocouple.

7. The system according to claim 1, further comprising one or more electromechanical, electronic, analog, and/or digital timers, which are adapted to be set for programming a turn off and/or on of the flame beyond an amount of time programmed by a user or after a predefined amount of ignition time with a safety function, or to activate or deactivate the power supply to the safety valve and/or an ignition electrode, respectively of a closing or opening drive signal of the safety valve and of the supply signal of the ignition electrode.

8. The system according to claim 7, wherein the power supply is provided in combination with luminous and/or acoustic signaling means of an operating condition of the safety valve and/or the burner.

9. The system according to claim 8, wherein said signaling means are provided in combination with message transmission means of the operating condition that transmit to a remote reception unit, said remote reception unit being provided with remote generation and transmission means of drive signals of the power supply of the drive signals of the safety valve and/or the ignition electrode.

10. The system according to claim 1, further comprising a visual or acoustic signaling unit and/or a unit transmitting operational information messages to remote devices, optionally portable, that inform of a flame presence condition.

11. The system according to claim 1, further comprising a flame detection system that comprises ionization sensors or operates by way of thermocouple voltage or by way of magnetic detection of thermocouple current.

12. The system according to claim 1, further comprising one or more flame detection devices selected from the group consisting of optical, thermal and magnetic sensor devices.

13. The system according to claim 1, further comprising a centralized generator/power supply for a drive signal shared between one or more safety valves of a plurality of safety valves, each of which is coupled to one of a plurality of gas feed taps to a different burner, and a control unit that controls the power supply of the drive signal of the respective safety valve for one or more of the different taps of said plurality of taps.

14. The system according to claim 1, further comprising a plurality of taps, one or more of said taps having an own safety valve, each tap being coupled to a different burner of a plurality of burners, said system being provided for at least one or more of said burners and composed of three modules, of which a first module includes the power supply of the drive signal of the safety valves of the taps of said plurality of burners, wherein the drive signal is shared by all of said safety valves, a basic drive module that commands the power supply of the drive signal of the safety valve of the taps of said plurality of burners and/or an ignition electrode, and a separate module for each tap of said one or more burners that comprises activation/deactivation timers of a respective burner.

15. A cooking device comprising one or more burners, each of which is supplied with a gas mixture having a flow is regulated by a tap, and each of which is provided with a flame presence detection device, wherein each tap is provided with a safety valve coupled to a respective burner, and wherein each safety valve is comprised within a magnet-thermocouple system according to claim 1.

* * * * *